(12) United States Patent
Lauden et al.

(10) Patent No.: US 11,395,985 B2
(45) Date of Patent: Jul. 26, 2022

(54) BARRIER VENT ASSEMBLY

(71) Applicant: Donaldson Company, Inc., Minneapolis, MN (US)

(72) Inventors: Jonathan Lauden, Minneapolis, MN (US); Michael J. Hebert, St. Paul, MN (US); Daniel Dotzler, Webster, MN (US); Daniel Little, Minnetonka, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 16/921,525

(22) Filed: Jul. 6, 2020

(65) Prior Publication Data

US 2020/0398203 A1 Dec. 24, 2020

Related U.S. Application Data

(63) Continuation of application No. 15/547,363, filed as application No. PCT/US2016/015387 on Jan. 28, 2016, now Pat. No. 10,717,031.

(Continued)

(51) Int. Cl.
*B01D 53/22* (2006.01)
*B01D 46/00* (2022.01)
(Continued)

(52) U.S. Cl.
CPC ....... *B01D 46/003* (2013.01); *B01D 39/1623* (2013.01); *B01D 39/2017* (2013.01);
(Continued)

(58) Field of Classification Search
CPC ........... B01D 46/2403; B01D 39/2024; B01D 2279/35; B01D 71/36; B01D 39/2017;
(Continued)

(56) References Cited

U.S. PATENT DOCUMENTS 1,522,068 A 1/1925 Morgan
2,795,290 A 6/1957 Butsch et al.
(Continued)

FOREIGN PATENT DOCUMENTS

CA 2437947 6/2008
CA 2647948 11/2011
(Continued)

OTHER PUBLICATIONS

"Extended European Search Report," for EP Patent Application No. 16744110.4 dated Aug. 1, 2018, 8 pages.
(Continued)

*Primary Examiner* — Anthony R Shumate
(74) *Attorney, Agent, or Firm* — Mueting Raasch Group

(57) ABSTRACT

The technology disclosed herein relates to a vent assembly having a vent housing that defines a first airflow pathway, a second airflow pathway, and a third airflow pathway. The first airflow pathway is configured for fluid communication with an interior of an enclosure. The second airflow pathway is configured for fluid communication with the external environment, and the third airflow pathway extends between the first airflow pathway and the second airflow pathway. A membrane is coupled to the vent housing such that the second airflow pathway and the third airflow pathway are in communication through the membrane. Coalescing filter media is disposed within the vent housing such that the third airflow pathway and the first airflow pathway are in communication through the coalescing filter media. The vent assembly defines a spacing region between the coalescing media and the membrane.

20 Claims, 13 Drawing Sheets

Related U.S. Application Data

(60) Provisional application No. 62/108,932, filed on Jan. 28, 2015.

(51) Int. Cl.
| | | |
|---|---|---|
| *B01D 63/08* | (2006.01) | |
| *B01D 39/16* | (2006.01) | |
| *B01D 39/20* | (2006.01) | |
| *B01D 46/24* | (2006.01) | |
| *B01D 61/14* | (2006.01) | |
| *B01D 71/36* | (2006.01) | |

(52) U.S. Cl.
CPC ..... *B01D 39/2024* (2013.01); *B01D 46/2403* (2013.01); *B01D 61/147* (2013.01); *B01D 63/087* (2013.01); *B01D 71/36* (2013.01); *B01D 2239/0216* (2013.01); *B01D 2239/0421* (2013.01); *B01D 2279/35* (2013.01)

(58) Field of Classification Search
CPC .......... B01D 46/003; B01D 2239/0421; B01D 2239/0216; B01D 39/1623; B01D 61/147; B01D 63/087
See application file for complete search history.

(56) References Cited

U.S. PATENT DOCUMENTS

| | | | |
|---|---|---|---|
| 3,251,475 | A | 5/1966 | Till et al. |
| 3,546,853 | A | 12/1970 | Claar |
| 4,141,472 | A * | 2/1979 | Spitzer ............ B65D 83/44 |
| | | | 137/199 |
| 4,351,203 | A | 9/1982 | Fukunaga |
| 4,440,308 | A | 4/1984 | Baker |
| 4,911,035 | A | 3/1990 | Taguchi |
| 5,348,570 | A | 9/1994 | Ruppert, Jr. et al. |
| 5,492,393 | A | 2/1996 | Peisker et al. |
| 5,509,949 | A | 4/1996 | Gluys et al. |
| 5,785,390 | A | 7/1998 | Gold et al. |
| 5,860,708 | A | 1/1999 | Borders et al. |
| 5,891,223 | A | 4/1999 | Shaw et al. |
| 6,058,969 | A | 5/2000 | Bollwahn et al. |
| 6,447,565 | B1 | 9/2002 | Raszkowski et al. |
| 6,484,594 | B1 * | 11/2002 | Saaski .............. G01N 1/2273 |
| | | | 73/863.21 |
| 6,712,887 | B2 | 3/2004 | Ueki et al. |
| 6,725,743 | B2 | 4/2004 | White |
| 7,156,890 | B1 | 1/2007 | Thompson et al. |
| 7,159,606 | B2 | 1/2007 | Paluncic et al. |
| 7,309,372 | B2 | 12/2007 | Kahlbaugh et al. |
| 7,314,497 | B2 | 1/2008 | Kahlbaugh et al. |
| 7,597,114 | B2 | 10/2009 | Buckingham et al. |
| 7,860,545 | B2 * | 12/2010 | Shults .............. A61L 31/10 |
| | | | 600/347 |
| 8,152,884 | B1 | 4/2012 | Severance et al. |
| 8,177,875 | B2 | 5/2012 | Rogers et al. |
| 8,460,424 | B2 | 6/2013 | Rogers et al. |
| 8,529,657 | B2 | 9/2013 | Kincaid et al. |
| 9,181,907 | B2 | 11/2015 | Copley et al. |
| 10,717,031 | B2 * | 7/2020 | Lauden ............ B01D 63/087 |
| 2002/0112802 | A1 | 8/2002 | D Amico et al. |
| 2003/0034016 | A1 | 2/2003 | Harvey et al. |
| 2003/0101866 | A1 | 6/2003 | Noack |
| 2006/0113248 | A1 | 6/2006 | Koenig et al. |
| 2006/0242933 | A1 | 11/2006 | Webb et al. |
| 2007/0240537 | A1 | 10/2007 | Basham |
| 2011/0154790 | A1 | 6/2011 | Israel et al. |
| 2012/0234748 | A1 | 9/2012 | Little et al. |
| 2014/0021135 | A1 * | 1/2014 | Sawyer .............. C02F 1/445 |
| | | | 210/652 |
| 2017/0304763 | A1 | 10/2017 | Nelson et al. |
| 2018/0021713 | A1 * | 1/2018 | Lauden ............ B01D 39/2017 |
| | | | 96/4 |
| 2018/0296777 | A1 * | 10/2018 | Terry ............... A24F 40/44 |
| 2019/0289908 | A1 * | 9/2019 | Worm .............. A61M 11/042 |
| 2019/0372449 | A1 * | 12/2019 | Mills ............... H02K 44/085 |
| 2020/0398203 | A1 * | 12/2020 | Lauden ............ B01D 46/2403 |

FOREIGN PATENT DOCUMENTS

| | | |
|---|---|---|
| CN | 101163534 A | 4/2008 |
| CN | 101410600 A | 4/2009 |
| CN | 101947400 A | 1/2011 |
| CN | 101466452 | 7/2012 |
| DE | 60201750 | 12/2005 |
| DE | 102007043462 | 2/2009 |
| EP | 1239189 | 8/2006 |
| EP | 2007500 | 12/2010 |
| EP | 2308579 | 4/2011 |
| IN | 3981/KOLNP/2008 | 2/2009 |
| JP | 2003-502549 A | 1/2003 |
| JP | 2008-518772 A | 6/2008 |
| JP | 2009-533633 A | 9/2009 |
| JP | 5336356 | 11/2013 |
| KR | 1020090008235 | 1/2009 |
| MX | 2008013346 | 1/2009 |
| WO | 2005100832 | 10/2005 |
| WO | 2006/052732 A2 | 5/2006 |
| WO | 2007/123815 | 11/2007 |
| WO | 2015/017377 | 2/2015 |
| WO | 2016/123354 | 8/2016 |

OTHER PUBLICATIONS

"International Preliminary Report on Patentability," for PCT Application No. PCT/US2016/015387 dated Aug. 10, 2017, 7 pages.

"International Search Report and Written Opinion," for PCT Application No. PCT/US2016/015387, dated Apr. 1, 2016, 9 pages.

"Stack" American Heritage Dictionary of the English Language, Fifth Edition. 2011 by Houghton Mifflin Harcourt Publishing Company, 1 pg. Available online at https://web.archive.org/web/20150329024457/https://www.thefreedictionary.com/stack (Year 2011).

Machine translation of Manfred DE 102007043462 Feb. 26, 2009 (Year: 2009).

* cited by examiner

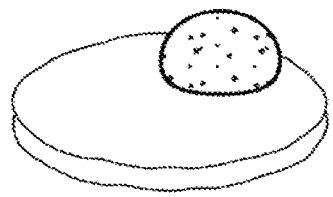 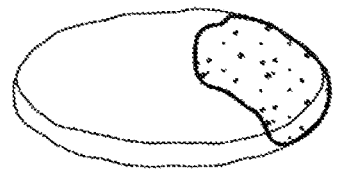
FIG. 12a    FIG. 12b
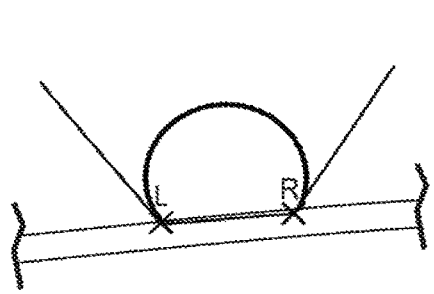 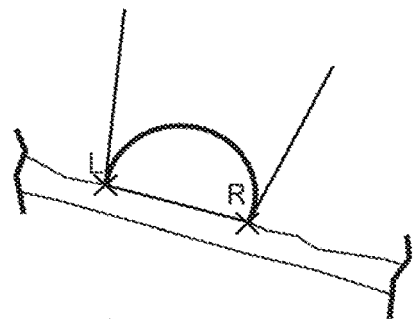
FIG. 13a    FIG. 13b
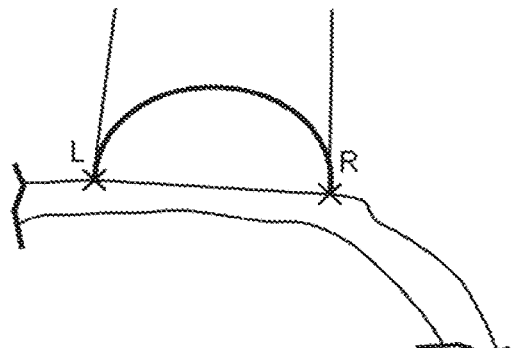
FIG. 13c

BARRIER VENT ASSEMBLY

This is a continuation application of U.S. patent application Ser. No. 15/547,363, filed on Jul. 28, 2017, which is a U.S. National Stage Entry of PCT International Patent Application No. PCT/US2016/015387, filed on Jan. 28, 2016, which claims priority to U.S. Provisional Patent Application No. 62/108,932, filed Jan. 28, 2015, the contents of each of which are herein incorporated by reference in their entireties.

TECHNOLOGICAL FIELD

The current technology relates to a vent assembly. More particularly, the current technology relates to a barrier vent assembly.

BACKGROUND

Various types of gearboxes, such as automotive transmissions, differential cases, and power transfer units, generally require some sort of breather vent that allows the pressure between the gearbox and the external environment to equalize. Some breather vents incorporate filter media to prevent the ingress of contaminants such as dust and fluids to the gearbox. For example, a microporous membrane can be used to prevent the entry of water in the gearbox. Oil particles that are present in the gearbox, however, can become airborne and lodge into the membrane. Some existing technology uses an oil sorbent (e.g., absorbent and/or adsorbent of oil) filter media that is configured to capture the oil particles before they reach the membrane. However, such vents have a relatively short lifespan because, as the oil particles accumulate in the media, the media becomes clogged, which decreases the life of the vent. Furthermore, because the sorbent filter media wicks the oil particles, the oil can foul the membrane relatively quickly.

BRIEF DESCRIPTION OF THE DRAWINGS

FIGS. 12a-12b are schematic drawings representing test results for two filter medias.

FIGS. 13a-13c are schematic drawings representing photographs of droplet contact angles for example filter media fibers.

The present technology may be more completely understood and appreciated in consideration of the following detailed description of various embodiments in connection with the accompanying drawings.

DETAILED DESCRIPTION

Figure 1:
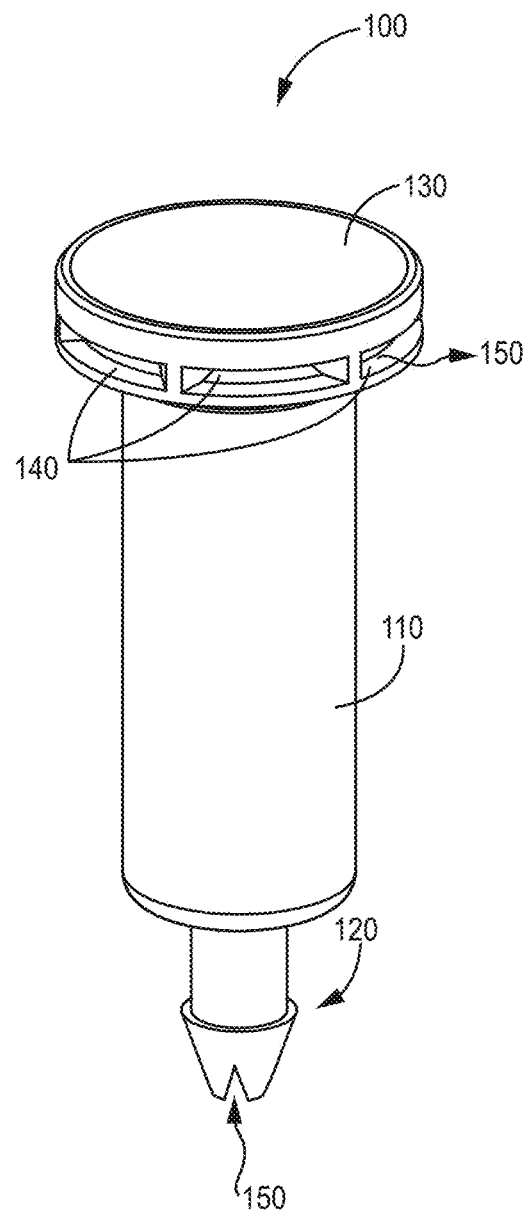
FIG. 1 is a perspective view of a vent assembly consistent with the technology disclosed herein.

FIG. 1 is a perspective view of a vent assembly consistent with the technology disclosed herein. The vent assembly 100 generally has a vent housing 110 defining a mounting structure 120 and an airflow pathway 150 extending from the mounting structure 120 to the environment external to the vent housing 110 (which will be referred to herein as the "external environment"). The vent housing 110 defines perimeter openings 140 such that the airflow pathway 150 extends to the external environment through the perimeter openings 140. The vent assembly 100 has a vent cap 130 that is coupled to the housing 110.

Figure 2:
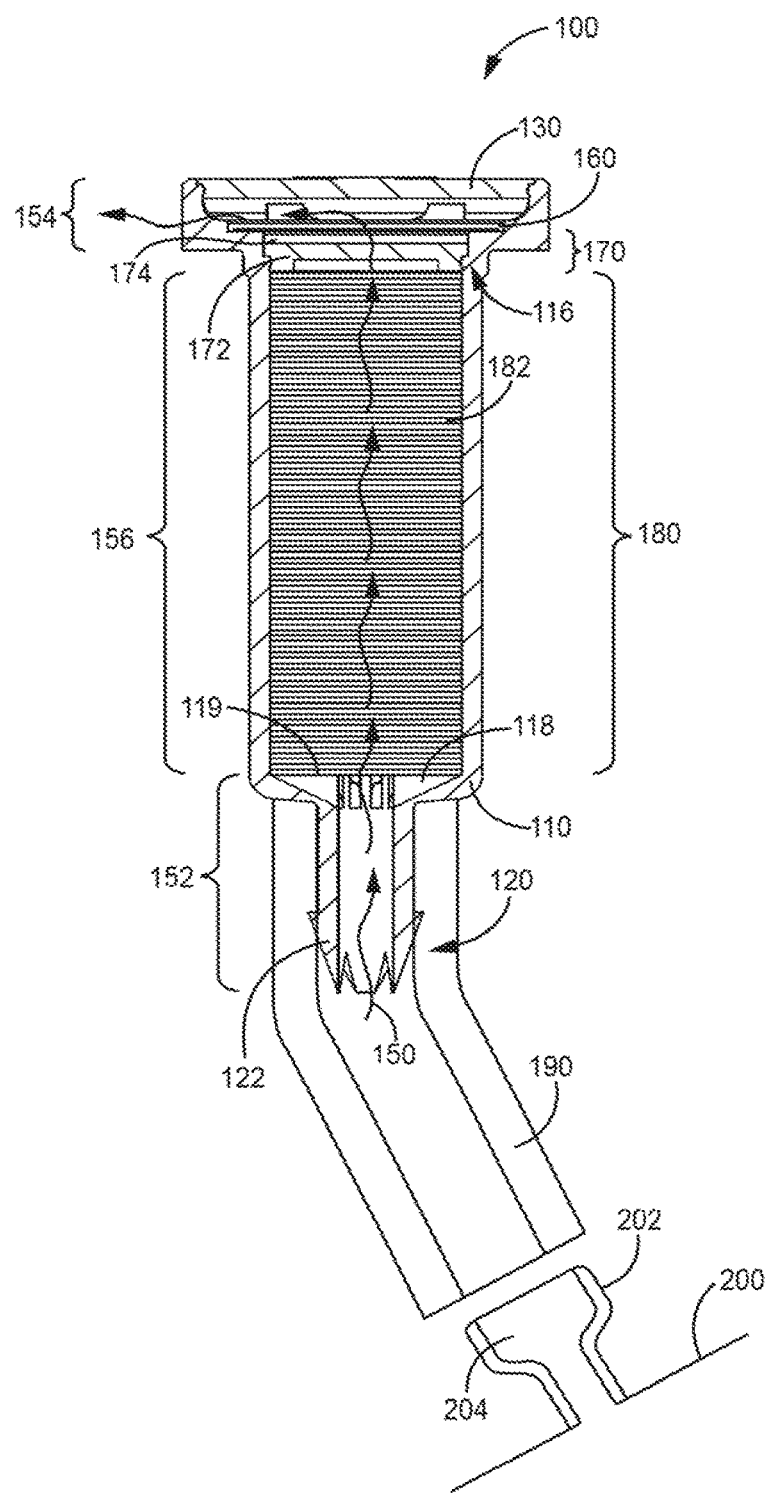
FIG. 2 is a cross sectional view of a vent assembly consistent with the embodiment depicted in FIG. 1 in an example implementation.
Figure 5:
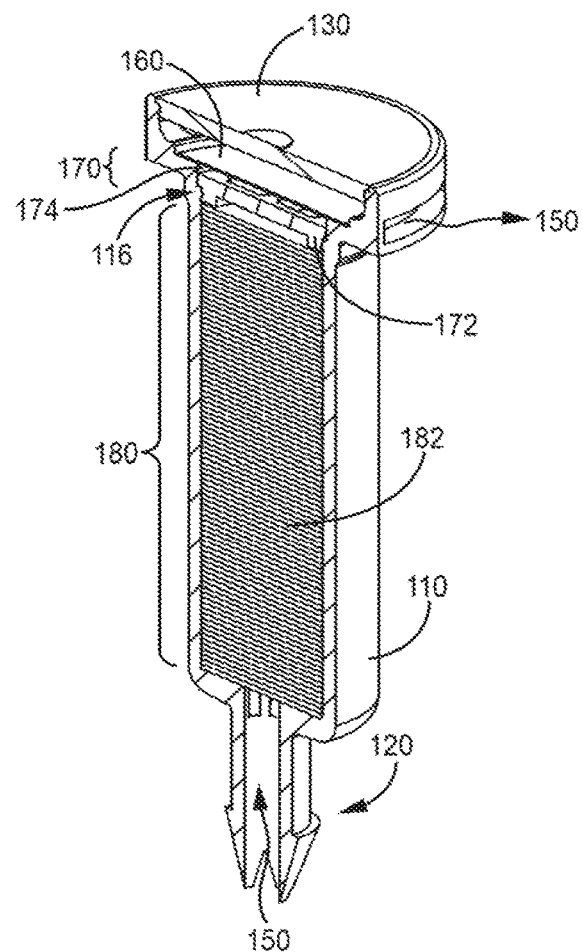
FIG. 5 depicts a cross-sectional perspective view of a vent assembly consistent with the technology disclosed herein.

FIG. 2 depicts a cross-sectional view of the vent assembly 100 in an example implementation. FIG. 5 depicts a perspective view of the vent assembly 100 and can be viewed in conjunction with FIG. 2 for understanding the descriptions herein. From the mounting structure 120, the airflow pathway 150 extends through a coalescing region 180 defined by the vent assembly 100, a spacing region 170 defined by the vent assembly 100, and a membrane 160 coupled to the vent housing 110. The vent coalescing region 180 is positioned between the membrane 160 and the mounting structure 130. The mounting structure 120 is mounted to a connector tube 190 that is configured to engage a connecting portion 202 sealably coupled to an enclosure 200. The connecting portion 202 defines a vent orifice 204 leading to the interior of the enclosure 200.

The enclosure 200 is generally configured to contain oil. The enclosure 200 can also be configured to contain moving parts, such as gears. The enclosure 200 can be used for a variety of applications such as, for example, transmission systems, transfer cases, gear boxes, power transfer units, axle components, and the like. Such applications can particularly be found within industries such as automotive, manufacturing, energy production, and the like. Those having skill in the art will appreciate the wide applicability of the current technology to a variety of technological fields.

In a variety of embodiments the connector tube 190 is constructed of rubber, and frictionally engages both the mounting structure 120 of the vent assembly 100 and the connecting portion 202 of the enclosure 200. In the current embodiment the mounting structure 120 defines a circumferential ridge 122 that engages the connector tube 190. The connecting portion 202 and the connector tube 190 can engage with surface friction and/or with physical elements such as barbs and/or other protuberances including ridges and/or bumps. Other approaches can be used to couple the vent assembly 100 to the enclosure 200, as will be appreciated. The vent assembly 100 can be sealably coupled to the enclosure 200 through other approaches such as with a snap fitting, screw, butt connection, and key and lock, as examples. In many implementations an o-ring is used to sealably couple the vent assembly to the enclosure 200. In some embodiments a mounting structure of a vent assembly can be configured to directly receive an opening defined in an enclosure.

The vent assembly 100 is generally configured to vent the enclosure 200 to which it is mounted while preventing the entry of dust, fluids, and other contaminants to the enclosure 200. In one embodiment, the vent assembly 100 is designed to achieve IP69K ingress protection, meaning that, upon installation, the vent assembly 100 protects the enclosure 200 against close-range, high-pressure, high-temperature spray-downs. The vent assembly 100 is also configured to enable the coalescence of oil droplets and drain the coalesced oil back into the enclosure 200.

Figure 3:
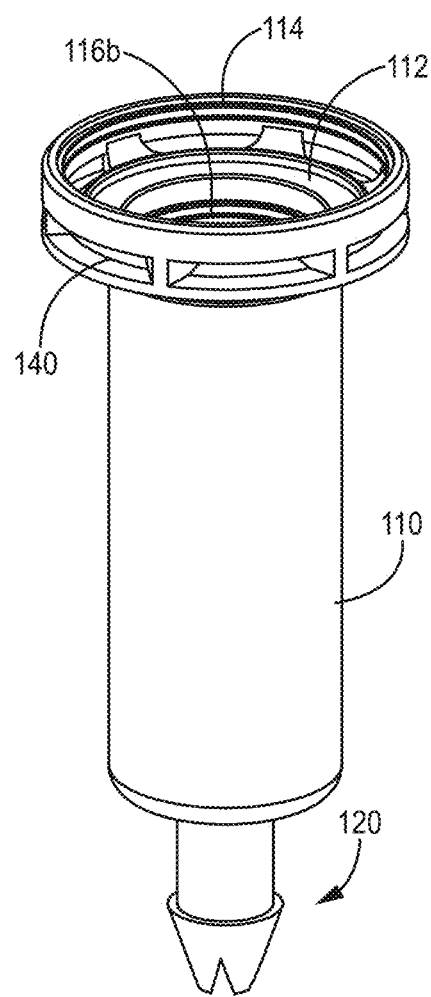
FIG. 3 is a perspective view of a vent assembly housing consistent with the technology disclosed herein.

The membrane 160 is generally configured to serve as a barrier to outside fluid and dust contamination for the enclosure 200 while allowing air exchange between the enclosure 200 and the environment external to the enclosure 200 (such as the atmosphere). As such, the membrane 160 is generally disposed across the airflow pathway 150. In a variety of embodiments, the membrane 160 is coupled to a membrane receiving surface 112 defined by the vent housing 100, where the membrane receiving surface 112 is visible in FIG. 3, which depicts a perspective view of the vent housing 100 without the cap 130 (see FIG. 1). In one embodiment, the membrane is pleated to increase airflow.

Various types of materials would be suitable for use as the membrane 160. Generally, the membrane 160 is a microporous material, where the term "microporous" is intended to mean that the material defines pores having an average pore diameter between about 0.001 and about 5.0 microns. The membrane 160 generally has a solidity of less than about 50% and a porosity of greater than about 50%. In a variety of embodiments, the membrane 160 has a plurality of nodes interconnected by fibrils. In a number of embodiments the membrane 160 is an expanded polytetrafluoroethylene (PTFE) membrane. The membrane 160 can also be constructed of polyamide, polyethylene terephthalate, acrylic, polyethersulfone, and/or polyethylene, as other examples. The membrane 160 can have the following physical properties: water entry pressure (WEP) of at least 5 psi and a Frazier permeability of greater than 0.275 ft/min at 0.5 inches $H_2O$ (0.01807 psi).

In some embodiments the membrane 160 is a laminate. For example, the membrane 160 can be a Tetratex™ grade from Donaldson Company, Inc., based in Minneapolis, Minn., which is laminated to a non-woven nylon support layer such as that available from Cerex Advances Fabrics, Inc. located in Cantonment, Fla. In such an example, the membrane has a WEP of about 9 psi and a Frazier permeability of about 1.8 ft/min at 0.5 inches $H_2O$ (0.01807 psi).

In a number of embodiments the membrane 160 is oleophobic. The membrane 160 can have an oleophobic treatment. In one particular embodiment the membrane 160 has an oleophobicity rating of 6, 7 or 8 based on AATCC Specification 118-1992 and ISO 14419.

The coalescing region 180 is generally configured to coalesce and drain oil particles from the air as it passes through the vent assembly 100 via the airflow pathway 150 from the enclosure 200. Such a configuration prevents a high percentage of air-bound oil particles from the enclosure 200 from depositing on the membrane 160, which can result in pore blockages in the membrane 160, resulting in reduced vent life. The coalescing region 180 is configured to enable coalescence of the oil particles into droplets within the vent assembly 100 and allow the oil to drain out of the coalescing region and back into the enclosure 200. The coalescing region 180 is not a sorbent of oil. In multiple embodiments, the coalescing region 180 is oleophobic in nature, which can prevent wicking of the oil against gravity upwards, towards the membrane 160, by reducing capillary action of the coalescing region 180. The coalescing media within the coalescing region 180 can have an oleophobicity of at least about 6.5 based on AATCC Specification 118-2013 and ISO 14419. In one embodiment the coalescing region has an oleophobicity of at least about 7, and more particularly has an oleophobicity of about 7.5.

The coalescing region 180 can be a variety of types of materials and combinations of materials. For example, the coalescing region 180 can have bi-component fibers. The bi-component fibers can be constructed of two different polyesters. In some embodiments, the coalescing region 180 can have glass fibers. In at least one embodiment the glass fibers are microfibers. Generally, the coalescing region 180 substantially lacks a binder material, where the term "binder material" is defined herein to exclude the fibers in the coalescing region, such as the bi-component fibers or other fibers. In a variety of embodiments, the coalescing region 180 of the vent assembly 100 contains coalescing filter media 182. Details about the materials used for the coalescing region 180, and particularly the coalescing filter media 182, will be described in more detail, below.

Coalescing filter media 182 in the coalescing region 180 of the vent assembly 100 can be a stack of a plurality of layers of synthetic filter media. A substantial portion of the layers can be stacked such that each flow face of each layer of filter media is in direct contact with the flow faces of adjacent layers of filter media. The term "flow face" is used to mean each surface of the filter media that is configured to face the directions of airflow through the airflow pathway 150. Each of the individual layers of filter media can have a relatively low particle filtration efficiency and low pressure drop. Generally, each layer of synthetic filter media has a maximum particle filtration efficiency of 15%, 10%, or even 8%, wherein "particle filtration efficiency"—when used herein with regard to a single layer of filter media—refers to the particle filtration efficiency of the single layer of filter media as challenged by 0.78 micron monodisperse polystyrene spherical particles at a face velocity of 20 ft/min, measured according to ASTM #1215-89. In one particular embodiment, each layer of synthetic filter media has a particle filtration efficiency of about 7%. In some embodiments each layer of synthetic filter media in the coalescing region 180 has about equal particle filtration efficiency. The relatively low particle filtration efficiency of each of the filtration layers can aid in oil removal by defining a relatively open pathway that provides less resistance to the coalesced oil when draining out of the coalescing region and towards the interior of the enclosure 200.

The coalescing region 180 is generally additionally configured to provide particle filtration. In a variety of embodiments, the coalescing region 180 has an elongate structure, meaning that the coalescing region 180 is longer than it is wide. Such an elongate structure can improve particle filtration by increasing the overall particle filtration efficiency of the coalescing region 180 relative to the individual layers of coalescing filter media 182. The coalescing region 180 can have an overall particle filtration efficiency of at least 90%, at least 95%, and/or at least 99%, wherein "overall particle filtration efficiency" is used herein to define the particle filtration efficiency of the coalescing region. The overall particle filtration efficiency refers to the percentage of particles that penetrate through the coalescing region when challenged by oil aerosol at 7.2 liter/min, using the test setup depicted in FIG. 8 and described in the corresponding description. The particle sizes of the oil aerosol are within the range of 0.19-2 micron, with a median particle size of 0.4 micron and a mode of 0.3 micron. The coalescing region 180 can have an initial pressure drop of less than 1.2 psi, 1.0 psi, or even 0.8 psi, where initial pressure drop is defined as the difference in pressure across the coalescing region 180 before any substantial amount of particles have been captured by the coalescing region 180, when challenged with oil aerosol at a face velocity of 3.94 ft/sec (1.2 m/sec)), using the test setup depicted in FIG. 8 and described herein.

In a variety of embodiments, the stack of the plurality of layers of synthetic filter media 182 can additionally have at least one secondary layer of coalescing filter media. The at least one secondary layer of coalescing filter media can have a particle filtration efficiency that is different than the rest of the layers of coalescing filter media. In a variety of embodiments, the at least one secondary layer of coalescing filter media has a particle filtration efficiency that is greater than the particle filtration efficiency of the rest of the layers of coalescing filter media. For example, the at least one secondary layer of coalescing filter media can have a particle filtration efficiency that is at least 15%, 30%, 60%, or even 70%. In one example, the at least one secondary layer of coalescing filter media can have a particle filtration efficiency of about 99%.

In embodiments where the at least one secondary layer of coalescing filter media has a relatively higher particle filtration efficiency, it can be desirable to position the at least one secondary layer of filter media away from the enclosure 200 due to the higher risk of fouling upon contact with oil from the enclosure 200. In at least one embodiment, the at least one secondary layer of coalescing filter media is positioned in the stack of layers of filter media towards the microporous membrane. In one particular embodiment, the at least one secondary layer of coalescing filter media is directly adjacent to the spacer region 170. In such an embodiment the at least one secondary layer of coalescing filter media would be the top layer of the stack of layers of filter media 182.

The at least one secondary layer of coalescing filter media can increase the overall particle filtration efficiency of the coalescing region 180 and/or reduce the overall length of the coalescing region 180 to achieve the desired overall particle filtration efficiency and thereby reduce the length of the filter pack. The at least one secondary layer of coalescing filter media can be treated for oleophobicity, as discussed above. In another embodiment, the at least one secondary layer of coalescing filter media is not oleophobic. In one embodiment the at least one secondary layer of coalescing filter media is consistent with media layers described in U.S. Pat. No. 7,314,497, issued on Jan. 1, 2008, which is incorporated herein by reference.

In a variety of embodiments the stack of the plurality of layers of filter media 182 has the number of layers of filter media that is sufficient to achieve the target overall particle filtration efficiency of the coalescing region 180. In some embodiments, the stack of the plurality of layers of synthetic filter media 182 has at least 2, 25, 50, 60, or even 70 layers of filter media. In one embodiment the coalescing region 180 has about 90 layers of synthetic filter media. Typically the total depth of the layers of filter media will be about 0.5 inches (12.7 mm) or more, and in one embodiment about 1.8 inches (45.7 mm) depending on the overall particle filtration efficiency desired.

Generally, each of the plurality of layers of filter media is stacked within the fluid pathway such that some of the layers are non-aligned with some other of the layers of filter media. In other words, each of the layers of synthetic filter media has a central axis, and, when stacked, a plurality of the central axes would not be collinear. In some embodiments, at least a portion of the layers of synthetic filter media has a flow-face area that is larger than the corresponding cross-sectional area of the airflow pathway 150. Such configurations can prevent air from flowing through the airflow pathway 150 without passing through at least a portion of the plurality of layers of synthetic filter media.

In a variety of embodiments, a substantial portion of each layer of the stacked layers of synthetic filter media 182 in the coalescing region 180 is substantially unbonded to adjacent layers of stacked synthetic filter media. A "substantial portion of each layer of stacked synthetic filter media" is intended to mean at least 50%, at least 60% or at least 80% of the layers of synthetic filter media in the stack. The term "substantially unbonded" is used to mean that at least 97% of the surface area of the layer of filter media is unbonded. In some such embodiments, each layer of the stacked layers of synthetic filter media 182 in the coalescing region 180 is substantially unbonded to adjacent layers of synthetic filter media. In some other embodiments, however, at least a portion of the layers of stacked synthetic filter media 182 are bonded to adjacent layers of synthetic filter media. In one example embodiment, a portion of the layers of stacked synthetic filter media 182 are thermally bonded to adjacent layers of synthetic filter media.

Now the materials contemplated for coalescing filter media will be described.

Coalescing Filter Media Description

Coalescing filter media consistent with the technology disclosed herein is generally a wet laid media. The wet laid media can be constructed consistently with, for example, U.S. Pub. No. 2012/0234748, filed on Mar. 16, 2012 or, in another example, U.S. Pat. No. 7,314,497, issued on Jan. 1, 2008, each of which are incorporated by reference herein. The wet laid media is formed in a sheet by wet laid processing, formed into disks, and is then inserted in the vent housing of the vent assembly. Typically, as described above, the wet laid media disks are stacked in a plurality of layers in the vent housing allowing gravity-assisted drainage of coalesced oil.

The media composition of the wet laid sheets used to form the coalescing region in a breather vent is typically as follows:

1. It is provided in a form having a calculated pore size (in the X-Y direction, explained in more detail, below) of at least 10 micron, usually at least 12 micron. The pore size is typically no greater than 80 micron, for example within the range of 12-60 micron, typically 15-45 micron.
2. It is formulated to have a particle filtration efficiency (at 20 fpm for 0.78 micron particles), within the range of 3-18%, typically 5-15%.
3. It is at least 30% by weight, typically at least 40% by weight, often at least 45% by weight and in some embodiments within the range of 85-95% by weight, based on total weight of material within the sheet, bi-component fiber material in accord with the general description provided herein.
4. It has 5 to 70%, by weight, based on total weight of material within the sheet, a secondary fiber material disposed among the bi-component fibers. This secondary fiber material can be a mix of fibers. In a variety of embodiments, cellulose fibers are used, but in some other embodiments glass microfibers are used. Alternatives are possible. In one embodiment the coalescing media has about 5-9%, or more particularly about 7.5%, cellulose by weight, and the remaining 91-95% is bi-component fiber. In an alternate embodiment the coalescing media has about 47-53%, or more particularly about 50%, glass microfiber by weight and the remaining 47-53% is bi-component fiber.

5. Typically the fiber sheet (and resulting filter media) includes no added binder material (excluding the material defining the fibers of the fiber sheet). If an added binder material is present, generally it is present at no more than about 7% by weight of the total fiber weight, and preferably no more than 3% by weight of the total fiber weight.

6. Typically the wet laid media is made to a basis weight of at least 20 lbs. per 3,000 square feet (9 kg/278.7 sq. m.), and typically not more than 120 lbs. per 3,000 square feet (54.5 kg/278.7 sq. m.). Usually it will be selected within the range of 35-130 lbs. per 3,000 sq. ft. (15.9 kg-54.4 kg/278.7 sq. m). In one particular embodiment the media has a basis weight of about 36.5 lbs to about 45.5 lbs. per 3,000 sq. ft.

7. Typically the wet laid media is made to a Frazier permeability (feet per minute) of 15-500 feet per minute (12-153 meters/min.), typically 100 feet per minute (30 meters/min.). For the basis weights on the order of about 35 lbs./3,000 square feet-130 lbs./3,000 square feet (15.9-54.4 kg/278.7 sq. meters), typical Frazier permeabilities would be about 300-600 ft./min. (60-120 meters/min.), and in some other embodiments would range from 15-50 ft/min.

8. The thickness of the wet laid media sheet(s) used to form the described coalescing region in the vent assembly at 0.125 psi (8.6 millibars) will typically be at least 0.01 inches (0.25 mm) often on the order of about 0.018 inch to 0.07 inch (0.45-1.78 mm); typically 0.018-0.03 inch (0.45-0.76 mm). In one embodiment the media sheet has a thickness of about 0.015 inch to about 0.023 inch at 1.5 psi.

A. Pore Size.

In general, if the pore size of the coalescing filter media is too low, drainage of coalesced oil particles by gravity, downwardly through (and from) the coalescing filter media can be difficult or slowed, which leads to an increase of re-entrainment of the oil into the gas stream; and if the porosity is too high, oil particles are less likely to collect and coalesce.

Barrier vents consistent with the technology disclosed herein can incorporate coalescing filter media having a pore size within the range of 12 to 80 micron. Typically the pore size is within the range of 15 to 45 micron. At least a portion of the layers of coalescing filter media that are configured to first receive gas flow from the enclosure with entrained oil for designs characterized in the drawings, through a depth of at least 0.25 inch (6.4 mm), has an average pore size of at least 20 microns. This is because in this region, a larger first percentage of the coalescing/drainage will occur. In upper layers, in which less coalescing drainage occur, a smaller pore size for more efficient filtering of solid particles can be desirable in some instances. In a variety of embodiments, at least a portion of the coalescing filter media in the coalescing region of the vent assembly has an average pore size of about 30-50 microns.

The term pore size and variants thereof when used herein with reference to the coalescing filter media, is meant to refer to the theoretical distance between fibers in a filtration media in the X-Y direction. X-Y refers to the surface direction versus the Z direction, which is the media thickness. The calculation assumes that all the fibers in the media are lined parallel to the flow face of the media, equally spaced, and ordered as a square when viewed in cross-section perpendicular to the length of the fibers. The pore size is a distance between the fiber surface on the opposite corners of the square. If the media is composed of fibers of various diameters, the $d^2$ mean of the fiber is used as the diameter. The $d^2$ mean is the square root of the average of the diameters squared. The pore size of the media can be estimated by reviewing electron photographs of the media. The average pore size of a media can also be calculated using a Capillary Flow Porometer having Model No. APP 1200 AEXSC available from Porous Materials, Inc. of Ithaca, N.Y.

Coalescing filter media in accord with the general definitions provided herein can have a mix of bi-component fibers and other fibers, and can be used in a vent assembly as generally described herein in connection with the figures. Typically enough media sheets would be used in the coalescing region to have an overall particle filtration efficiency of at least 85%, typically 90% or greater. In some instances it would be preferred to have the efficiency at 95% or more and even 99% or more.

B. Thickness

The thickness of media utilized to make the coalescing regions according to the present disclosure is typically measured using a dial comparator such as an Ames #3 W (BCA Melrose Mass.) equipped with a round pressure foot, one square inch. A total of 2 ounces (56.7 g) of weight is applied across the pressure foot.

Typical wet laid media sheets useable to be stacked to form coalescing regions according to the present disclosure have a thickness of at least 0.01 inches (0.25 mm) at 0.125 psi (8.6 millibars), up to about 0.06 inches (1.53 mm), again at 0.125 psi (8.6 millibars). Usually, the thickness will be 0.018-0.03 inch (0.44-0.76 mm) under similar conditions.

C. The Media Composition.

1. The Bi-Component Fiber Constituent.

As indicated above, it is preferred that the fiber composition of the media include 30 to 95%, by weight, of bi-component fiber material. A major advantage of using bi-component fibers in the media, is effective utilization of fiber size while maintaining a relatively low solidity. With the bi-component fibers, this can be achieved while still accomplishing a sufficiently high strength media for handling installation in vent assemblies.

The bi-component fibers generally comprise two polymeric components formed together, as the fiber. Various combinations of polymers for the bi-component fiber may be useful, but it is important that the first polymer component melt at a temperature lower than the melting temperature of the second polymer component and typically below 205° C. Further, the bi-component fibers are integrally mixed and evenly dispersed with the other fibers, in forming the wet laid media. Melting of the first polymer component of the bi-component fiber is necessary to allow the bi-component fibers to form a tacky skeletal structure, which upon cooling, captures and binds many of the other fibers, as well as other bi-component fibers.

Although alternatives are possible, typically the bi-component fibers will be formed in a sheath core form, with a sheath comprising the lower melting point polymer and the core forming the higher melting point.

In the sheath-core structure, the low melting point (e.g., about 80 to 205° C.) thermoplastic is typically extruded around a fiber of the higher melting point material (e.g., about 120 to 260° C.). In use, the bi-component fibers typically have a average largest cross-sectional dimension (average fiber diameter, if round) of about 5 to 50 micrometer often about 10 to 20 micrometer and typically in a fiber form generally have an average length of at least 1 mm, and not greater than 30 mm, usually no more than 20 mm, typically 1-10 mm. By "largest" in this context, reference is meant to the thickest cross-section dimension of the fibers.

Such fibers can be made from a variety of thermoplastic materials including polyolefins (such as polyethylenes, polypropylenes), polyesters (such as polyethylene terephthalate, polybutylene terephthalate, PCT), nylons including nylon 6, nylon 6,6, nylon 6,12, etc. Any thermoplastic that can have an appropriate melting point can be used in the low melting component of the bi-component fiber while higher melting polymers can be used in the higher melting "core" portion of the fiber. The cross-sectional structure of such fibers can be a "side-by-side" or "sheath-core" structure or other structures that provide the same thermal bonding function. One could also use lobed fibers where the tips have lower melting point polymer. The value of the bi-component fiber is that the relatively low molecular weight resin can melt under sheet, media, or filter forming conditions to act to bind the bi-component fiber, and other fibers present in the sheet, media, or filter making material into a mechanically stable sheet, media, or filter.

Typically, the polymers of the bi-component (core/shell or sheath and side-by-side) fibers are made up of different thermoplastic materials, such as for example, polyolefin/polyester (sheath/core) bi-component fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. One type of bi-component fiber that is contemplated is 271P available from DuPont, based in Wilmington, Del. Other fibers include FIT 201, Kuraray N720 and the Nichimen 4080 and similar materials. All of these demonstrate the characteristics of cross-linking the sheath polymer upon completion of first melt. This can be useful for oil applications where the application temperature is typically above the sheath melt temperature. If the sheath does not fully crystallize then the sheath polymer will re-melt in application and coat or damage downstream equipment and components.

An example of a useable bi-component fiber for forming wet laid media sheets for use in the coalescing region of the breather vent is Dupont polyester bi-component 271P, which can be cut to a length of about 6 mm.

2. The Secondary Fiber Materials.

The bi-component fibers provide a matrix for the coalescing filter region. The secondary fibers sufficiently fill the matrix to provide the desirable properties for efficiency, if increased efficiency is desirable. In some embodiments secondary fibers are used to increase the strength of the bi-component fiber matrix.

The secondary fibers can be polymeric fibers, glass fibers and/or microfibers, cellulose fibers, metal fibers, ceramic fibers or a mixture of any of these. In at least one embodiment, cellulose fibers are the only type of secondary fiber used with the bi-component fibers. In some other embodiments, glass fibers, polymeric fibers or a mixture are used as the secondary fiber materials.

In some embodiments the coalescing filter media has glass microfibers. In some other embodiments the coalescing filter media substantially lacks glass microfibers. Glass microfibers can be used in embodiments where relatively higher particle filtration efficiency is desirable and a relatively higher pressure drop is tolerable. Glass fibers useable in filter media of the present technology include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers.

Non-woven media of the currently-described technology can contain secondary fibers made from a number of both hydrophilic, hydrophobic, oleophilic, and oleophobic fibers. These fibers cooperate with the glass fiber (if used) and the bi-component fiber to form a mechanically stable, but relatively strong, permeable filtration media that can withstand the mechanical stress of the passage of fluid materials and can maintain the loading of particulate during use. Secondary fibers are typically monocomponent fibers with average largest cross-sectional dimension (diameters if round) that can range from about 0.1 micron and up, typically 1 micron or greater, often 15-55 microns, and occasionally 8-15 microns, and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

Thermoplastic fibers can be used as secondary fibers, as well, not limited to polyester fibers, polyamide fibers, polypropylene fibers, copolyetherester fibers, polyethylene terephthalate fibers, polybutylene terephthalate fibers, polyetherketoneketone (PEKK) fibers, polyetheretherlcetone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types.

Mixtures of the fibers can be incorporated in the coalescing filter media, to obtain certain desired efficiencies and other parameters.

The coalescing filter media of the current disclosure are typically made using papermaking processes. Such wet laid processes are particularly useful and many of the fiber components are designed for aqueous dispersion processing. However, the media of the currently-described technology can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter.

For a commercial scale process, the bi-component matrices of the current technology are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bi-component mat of the current disclosure can be prepared by forming a bi-component fiber slurry and a cellulose or glass fiber slurry and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bi-component web.

The binder in the bi-component fibers is activated by passing the web through a heating step. The resulting material can then be collected in a large roll if desired.

3. Surface Treatments of the Fibers.

Modification of the surface characteristics of the fibers, such as to increase the contact angle between the fiber and the oil, such as with an oleophobic treatment, can enhance drainage capability of the coalescing region and prevent the sorption of oil by the fibers in the coalescing region. A method of modifying the surface of the fibers is to apply a surface treatment such as a fluorochemical or silicone containing material, typically up to 5% by weight of the media. Such treatments can enhance the oleophobicity of the filter media.

The fibers of the coalescing filter media can generally be characterized as oleophobic. Oleophobicity is typically imparted to the coalescing filter media by depositing a layer of oleophobic fluorochemical on the media fibers and/or by submerging the coalescing filter media in a solution of the fluorochemical (dip coating), among other means. Lick rolling, gravure coating, and/or curtain coating are some other example ways that the coalescing filter media can be treated for oleophobicity.

The surface treatment agent can be applied during manufacture of the fibers, during manufacture of the media or after manufacture of the media. Numerous treatment materials are available such as fluorochemicals or silicone containing chemicals that increase the contact angle between the fibers and the particular type of oil of-interest. Particular surface treatments that are contemplated are discussed in U.S. Pub. No. 2012/0234748, referenced above.

In more general terms, a coalescing region manages both coalescing/drainage of oil particulates and also filtration of particles. It can be desirable for the collected oil to drain rapidly; otherwise the functional life of the filter media would be uneconomically short. The media is positioned so the oil can drain from the media rapidly. Some key performance properties of the vent assembly are: initial and equilibrium fractional efficiency, pressure drop and drainage ability. Some key physical properties of the media are: thickness, solidity and strength.

Generally the media for coalescing/drainage is aligned in a manner that enhances the filters ability to drain. In a variety of constructions, this would be a media configured in an elongate, vertical orientation. In this orientation, any given media composition will exhibit an equilibrium load height which is a function of the pore size, fiber orientation and the interaction of the oil with the fiber surface, measured as the contact angle. Collection of oil in the media will increase in height to a point balanced with the drainage rate of the oil from the media. Of course any portion of the media that is plugged with draining oil is not generally available for particle filtration. Thus, such plugged portions of the media cause an increase in pressure drop and a decrease in particle filtration efficiency of the filter. As a result, it can be advantageous to control the portion of the coalescing region that is most available to be plugged by oil. Alternately stated is it is advantageous to increase the drainage rate, particularly in a portion of the coalescing region closest to the enclosure.

The media properties effecting drainage rate are pore size, fiber orientation, and interaction of the oil being drained with the fiber surface. Such properties can be refined to accomplish a desirable oil flow. Increasing the pore size facilitates drainage, as explained above. However increasing the pore size reduces the number of fibers for filtration, thus reducing the overall efficiency of the coalescing region. To achieve target efficiency, a relatively thick coalescing region can be formed by using multiple layers of material having a desirable pore size.

In a variety of embodiments a substantial portion of the layers of coalescing filter media is consistent with the disclosure of U.S. Pub. No. 2012/0234748, referenced above.

Returning to FIG. 2, the vent assembly 100 is configured to direct coalesced oil that has drained out of the coalescing region 180 into the enclosure 200. Gravity can aid in the draining of the coalesced oil out of the coalescing region 180. One or more run-off surfaces 118 defined by the vent housing 110 can direct the draining coalesced oil into the enclosure 200. The run-off surfaces 118 generally are positioned to receive coalesced oil that is drained out of the coalescing region 180. The run-off surfaces 118 are ramped downwards towards the vent orifice 204 of the enclosure 200 such that gravity can assist the draining of the coalesced oil into the enclosure 200. In the current embodiment the vent housing 110 defines a plurality of discrete run-off surfaces 118, but in some embodiments the vent housing 100 can define a single run-off surface. In the current embodiment the plurality of discrete run-off surfaces 118 are defined between substantially planar platform surfaces 119 of the vent housing 110 on which the coalescing filter media 182 is situated.

Figure 7:
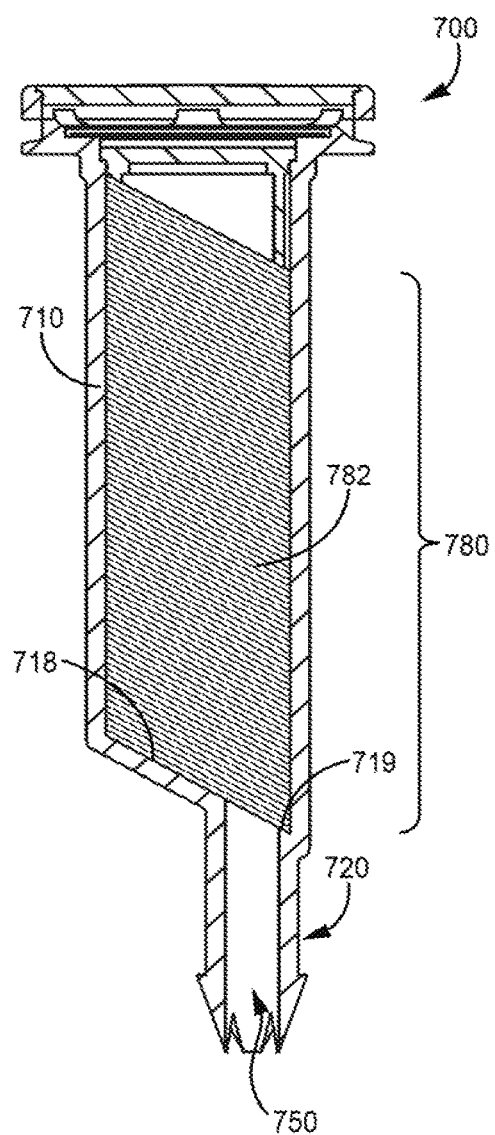
FIG. 7 depicts a cross-sectional view of another vent assembly consistent with the technology disclosed herein.

FIG. 7 shows an example embodiment demonstrating an alternate run-off surface 719 consistent with the technology disclosed herein. The vent assembly 700 is similar to those embodiments that have already been and will be described herein, except in this embodiment the vent housing 710 of the vent assembly 700 has a run-off surface 718 that defines a single fluid draining pathway that is also a platform surface on which the coalescing filter media 782 is stacked. As such, the coalescing filter media 782 is stacked at an angle that matches the angle of the run-off surface 718. A mounting structure 720 defining an airflow pathway 750 is positioned asymmetrically relative to the vent housing 710. The run-off surface 718 is ramped downward towards the airflow pathway 750 such that oil draining from the coalescing region 780 is directed toward the airflow pathway 750 to drain into an enclosure. A ledge region 719 adjacent to the run-off surface 718 supports the stack of coalescing filter media 782 along a circumferential portion of the base of the stack 782.

Returning again to FIG. 2, the spacing region 170 of the vent assembly 100 is generally configured to prevent contact between oil from the enclosure 200 and the membrane 160. In particular, the spacing region 170 can be configured to impede wicking of the oil towards the membrane 160. The spacing region 170 can also be configured to prevent contact between the coalescing filter media 182 and the membrane 160. The spacing region 170 can be a physical barrier between the coalescing region 180 and the membrane 160. In at least one embodiment, the spacing region 170 can be a physical barrier that is configured to contain the coalescing filter media within the coalescing region.

In a variety of embodiments, including that depicted in FIG. 2, the spacing region 170 is at least partially defined by a media spacer 172. The media spacer 172 is disposed within the vent housing 110 between the elongate coalescing region 180, particularly the coalescing filter media 182, and the membrane 160. The spacing region 170 is also defined by a physical gap 174 between the media spacer 172 and the membrane 160. In an alternate embodiment, the spacing region lacks a media spacer and is merely a physical gap between the coalescing region and the membrane.

Figure 4:
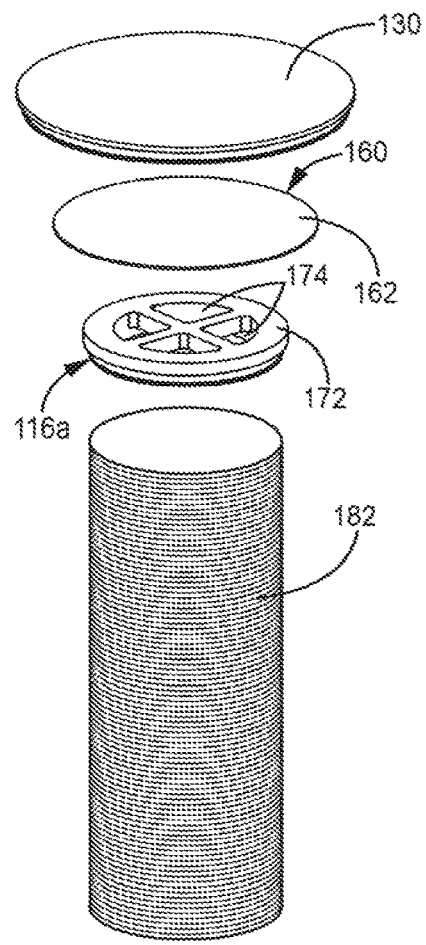
FIG. 4 is a perspective, exploded view of vent assembly components consistent with the technology disclosed herein.

In the current embodiment, the media spacer 172 is generally configured to prevent contact between the coalescing filter media 182 and the membrane 160. The media spacer 172 is also configured to define a portion of the airflow pathway 150 such that air flowing through the coalescing region 180 towards the membrane 160 passes the media spacer 172. In the currently described embodiment, the media spacer 172 extends across the airflow pathway 150 and defines a plurality of openings 174 that define the airflow pathway 150. The plurality of openings 174 are visible in FIG. 4, which depicts an exploded view of example vent assembly components without the vent housing 100.

The media spacer 172 can be constructed of a variety of types of materials. For example, in some embodiments the media spacer 172 is a moldable material, such as plastic. In some embodiments the media spacer 172 is machineable. In some embodiments, the media spacer 172 is a fabric. Other configurations for a media spacer are possible. In one alternate example embodiment, a media spacer can have a ring configuration. In another example embodiment, a media spacer can be one or more projections extending from the vent housing at least partially into the airflow pathway. In yet another example embodiment, the media spacer can be a woven material that is configured to prevent wicking of oil, such as by having a relatively thick fiber diameter.

The media spacer 172 is coupled to the vent housing 110. The media spacer 172 can be coupled to the vent housing 110 in a variety of ways, as will be appreciated. In a variety of embodiments, including that depicted in FIG. 2, the media spacer 172 and the vent housing 110 are configured to mutually engage. Particularly, the media spacer 172 and the vent housing 110 mutually define an interference fit 116 that substantially retains the position of the media spacer 172 relative to the vent assembly 100. In such an embodiment the media spacer 172 defines a coupling structure 116a (See FIG. 4) that is configured to be received by a mating structure 116b (see FIG. 3) of the vent housing 110. In an alternative embodiment, the media spacer and the vent housing define threads that are configured to mutually engage. In some embodiments, the media spacer 172 can compress the stack of layers of coalescing filter media 182. In some other embodiments, the media spacer does not compress the stack of layers of coalescing filter media 182.

Figure 6:
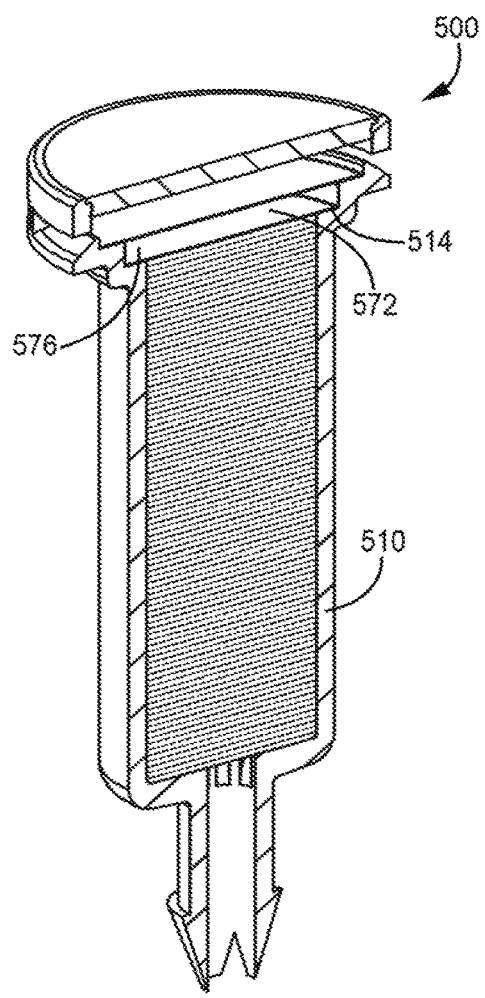
FIG. 6 depicts a perspective cross-sectional view of an alternate vent assembly consistent with the technology disclosed herein.

In an alternate embodiment consistent with FIG. 6, a vent assembly 500 is similar to the vent assembly as has been and will be described herein with respect to FIG. 2, except that a media spacer 572 of the vent assembly 500 defines a perimeter region 576 in which the media spacer 572 is coupled to the vent housing 510. The media spacer 572 can be coupled to the vent housing 510 with a weld, adhesive, or through other means generally known in the art. The media spacer is coupled to the vent housing 510 in a rim region 514 defined vent housing 510.

Returning back to FIG. 2, and as mentioned above, the vent housing 110 generally defines an airflow pathway 150 that extends from the mounting structure 120 to the external environment relative to the vent housing 110 (such as the atmosphere). The airflow pathway 150 can be characterized as being the combination of three airflow pathways that are depicted in FIG. 2. A first airflow pathway 152 is configured for fluid communication with the interior of the enclosure 200. A second airflow pathway 154 is configured for fluid communication with the external environment, and a third airflow pathway 156 extends between the first airflow pathway 152 and the second airflow pathway 154. The second airflow pathway 154 extends from the membrane 160 to the external environment through the perimeter openings 140 defined by the vent housing 110. The membrane 160 is coupled to the vent housing 110 such that the second airflow pathway 154 and the third airflow pathway 156 are in communication through at least a portion of the membrane 160. The stack of layers of coalescing filter media 182 is disposed within the vent housing 110 such that the third airflow pathway 156 and the first airflow pathway 152 are in communication through at least a portion of the coalescing filter media 182. The media spacer 172 can be configured to define a portion of the third airflow pathway 156.

The vent cap 130 is coupled to the vent housing 110 and is generally configured to shield a flow face 162 (See FIG. 4) of the membrane 160 from the environment. The perimeter openings 140 defined by the vent housing 110 are generally defined to similarly shield the flow face 162 of the membrane 160 from the environment. Shielding the flow face of the membrane is intended to mean that the relevant features of the vent assembly are configured to prevent environmental contaminants from directly impacting the flow face of the membrane.

Vent Assembly Testing

A test was designed and constructed to compare and evaluate the performance of breather vents with efforts made to simulate real-world conditions that may be encountered by such a vent. An Example Breather Vent was consistent with the embodiment depicted in FIGS. 1-5 and had a microporous PTFE membrane laminated to a non-woven nylon support layer coupled to a vent housing, an oleophobic coalescing region having bi-component polyester fibers and about 7.5% by weight cellulose fibers, and a spacing region between the microporous membrane and the coalescing region. A Comparative Breather Vent was also tested which was the VE2048 breather vent provided by Gore Enterprises based in Newark, Del. The Comparative Breather Vent had a microporous membrane coupled to a vent housing and sorbent fibers disposed in the housing between a mounting region and the microporous membrane.

Figure 8:
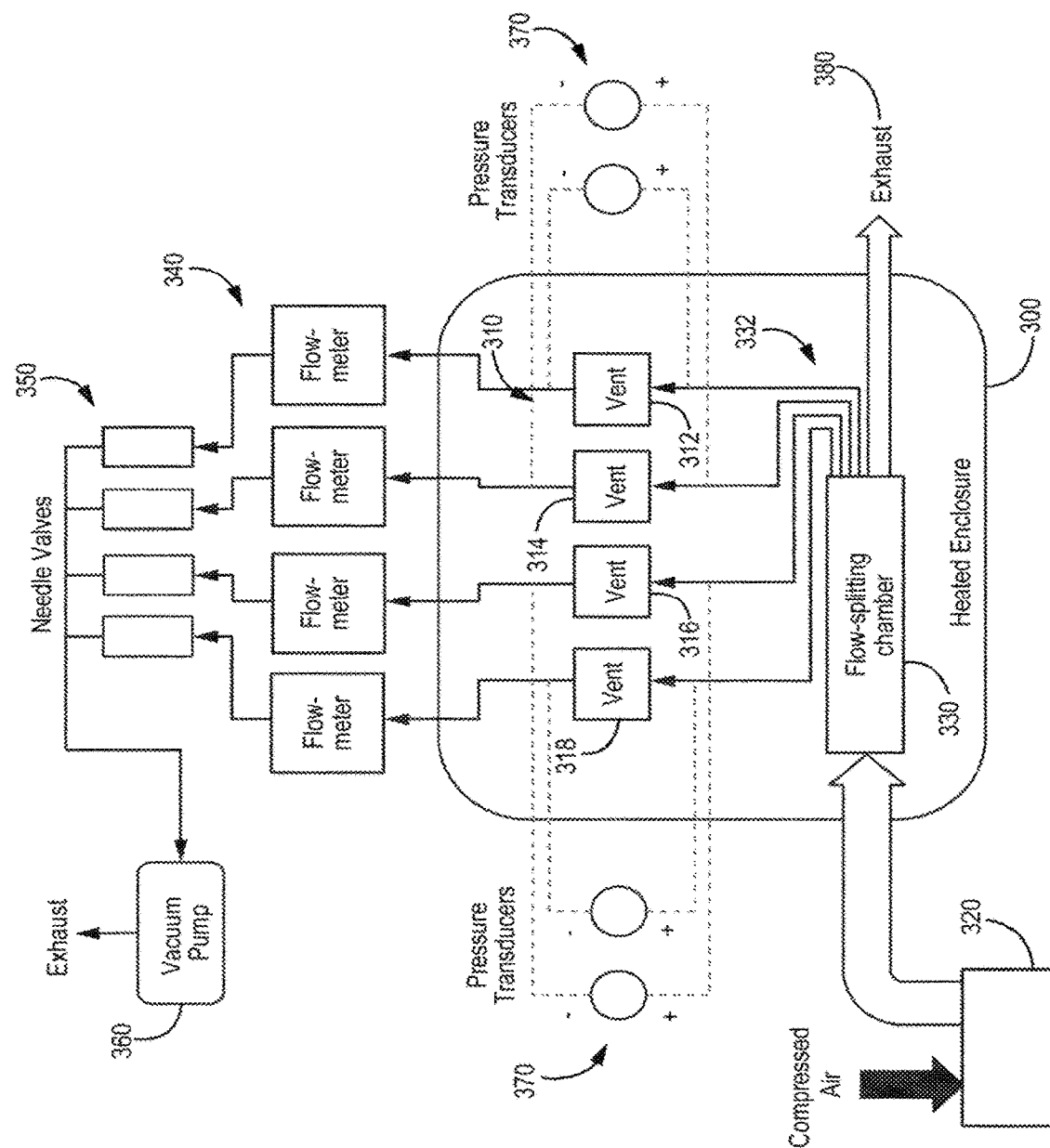
FIG. 8 is a schematic diagram of an example test set-up.

A schematic depiction of the test set up is shown in FIG. 8. A steady flow of heated oil aerosol was directed through the heated enclosure 300 and up through the sample vents 312-318 to be tested, while the pressure drop across the vents 312-318 was recorded. Particular details regarding the test set-up will now be described.

Compressed air, pressurized at 1 bar, was supplied to a Palas PLG-2110 Aerosol Generator 320 filled with Mopar SAE 75 W-140 Synthetic lubricant maintained at a temperature of 90° C. The flow of oil particles produced by the aerosol generator 320, at a rate of 0.43 grams of oil per hour, was directed into a cylindrical chamber 330 into which four steel tubes 332 were inserted. The opening of each tube 332 was positioned facing the flow, such that some oil aerosol was directed into each tube 332, and the remaining flow was allowed to pass through the cylinder 330 as system exhaust 380. Each steel tube 332 was connected to the inlet of a vent 310 to be tested. The cylindrical chamber 330, vents 310, and tubing were all placed within a heated enclosure 300 with a maintained temperature of 90° C. Cole Parmer flowmeters 340 with a range of 20-200 mL/min were connected downstream of the breather vents 310 to measure the rate of flow through each vent 310. Each flowmeter 340 was then connected to a needle valve 350, which was connected to a vacuum pump 360.

Taps were added upstream and downstream of each vent 310 and connected to a Setra pressure transducer 370 to measure the pressure differential across each vent 310. Two transducers had a range of 0-50 inches $H_2O$, and two had a range of 0-100 inches $H_2O$, and all four were powered by a single 24V/4.17A DC power supply. Data was collected by a National Instruments USB-6001 data acquisition system, and recorded in National Instruments LabVIEW software. The pressure transducers 370 were calibrated by comparing voltage measurements from the transducer to the pressure differential measured by a calibrated Meriam M100 digital manometer.

Figure 9:
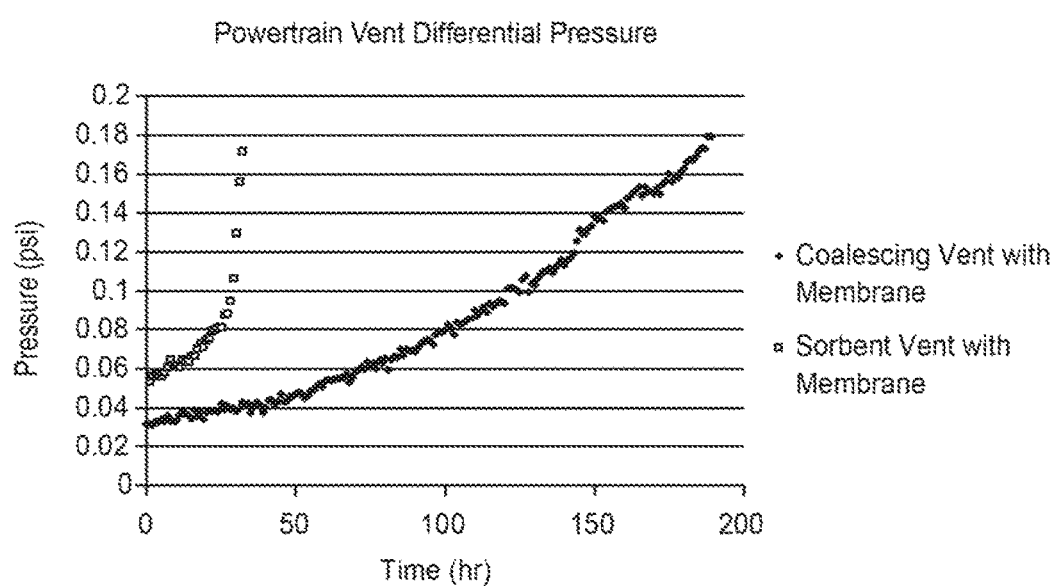
FIG. 9 is a graph depicting comparative test results of vent assemblies.

FIG. 9 is a graph depicting comparative test results of the vent assemblies discussed above, demonstrating the amount of time needed for each vent to reach a differential pressure of 0.18 psi. As is demonstrated, the Example Breather Vent had a lower differential pressure over time. An increase in the differential pressure is an indicator of obstruction of the pores in the filter media by the oil particles in the aerosol as the oil particles accumulate. The data in FIG. 9 suggests that the Example Breather Vent has a longer useful life than the Comparative Breather Vent. Much of the performance improvement in pressure drop of the Example Breather Vent is thought to be attributable to the use of (1) an oleophobic coalescing filter media and (2) media having an open pore structure of the Example Breather Vent, instead of the oil-sorbent filter media used in the Comparative Breather Vent. Since the coalescing region of the Example Breather Vent does not absorb/adsorb the oil, the oil is more likely to drain and, therefore, less likely to obstruct the pores in the filter media. Test data depicted in FIGS. 10-13, described below, further supports this conclusion.

Figure 10:
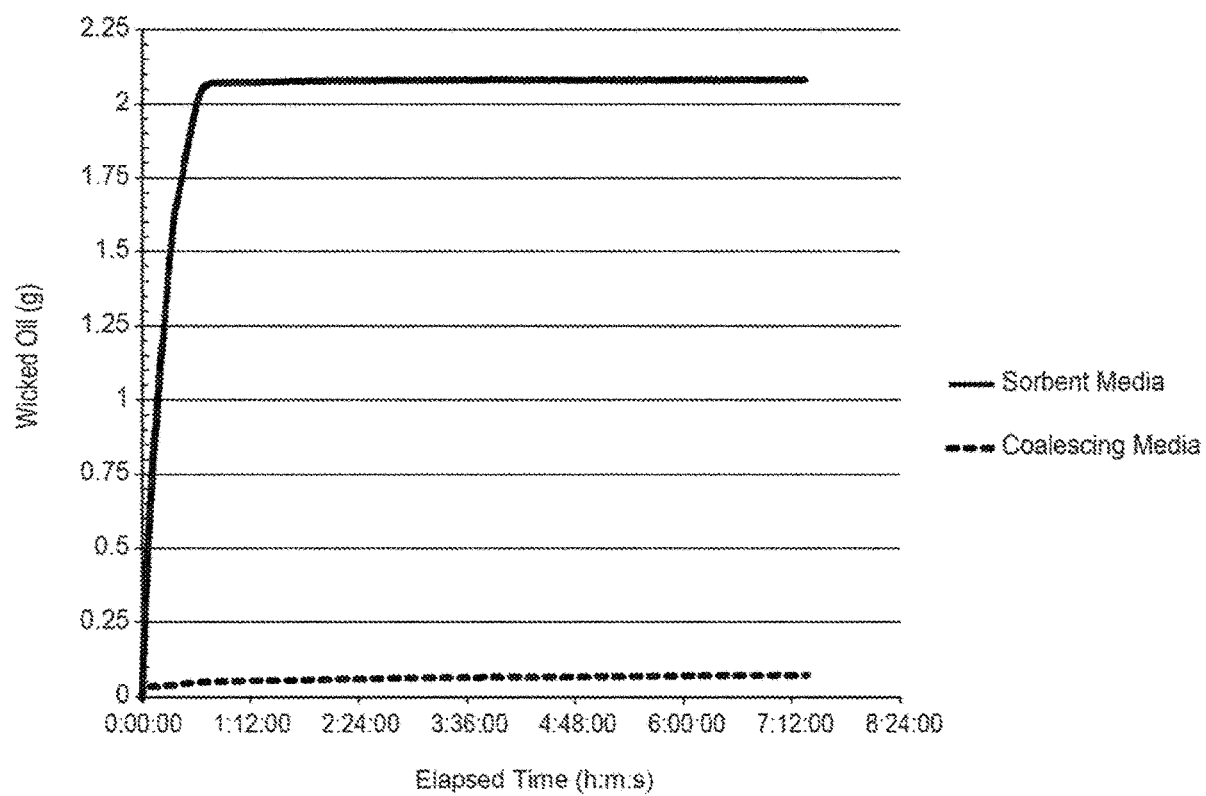
FIG. 10 is a graph depicting comparative test results of vent assemblies.

With regard to test data reflected in FIG. 10, the lower 0.08 inches of a 0.5-inch vertical stack of a coalescing filter media (consistent with a coalescing region 180, discussed above with reference to FIGS. 1-5) and an equally-sized vertical stack of an oil-sorbent filter media were submerged in a container of liquid oil for over seven hours. The oil was Mopar SAE 75 W-140 Synthetic lubricant. The oil-sorbent filter media was not oleophobic and had untreated cellulose fibers with a layer of untreated polypropylene fibers disposed within the stack. The coalescing region had coalescing filter media having bi-component polyester fibers and about 7.5% cellulose fibers by weight. The coalescing filter media was treated to be oleophobic. The mass of each stack of filter media was recorded incrementally to track the total mass of oil that was absorbed/adsorbed by each filter.

As demonstrated in FIG. 10, the sorbent media accumulated over 2 grams of oil, while no appreciable amount of oil accumulated in the coalescing filter media. Visual inspection of the media stacks revealed that the oil wicked vertically up the entire length of the stack of sorbent filter media extending above the liquid oil (0.42-inches), whereas the oil did not wick vertically up the stack of coalescing filter media extending above the liquid oil. The data of FIG. 10 supports the conclusion from FIG. 9 that some coalescing regions consistent with the technology disclosed herein are not sorbents of liquid oil because they do not accumulate an appreciable amount of oil in a wick test, where the liquid oil is consistent with the type of oil used in the environment in which the filter media will be used. Similarly, some coalescing regions consistent with the technology disclosed herein are not sorbents of liquid oil because they do not wick liquid oil up vertically through the coalescing region, against gravity. It is expected that an increased ability of a media to absorb/adsorb liquid oil can reduce barrier vent life because the entrained oil that is captured by the media eventually accumulates into a pooled mass of oil that is retained by the media and obstructs pores. It is noted that the term "liquid oil," for purposes of this disclosure, refers to a pooled mass of oil that is not entrained in a gas.

Figure 11:
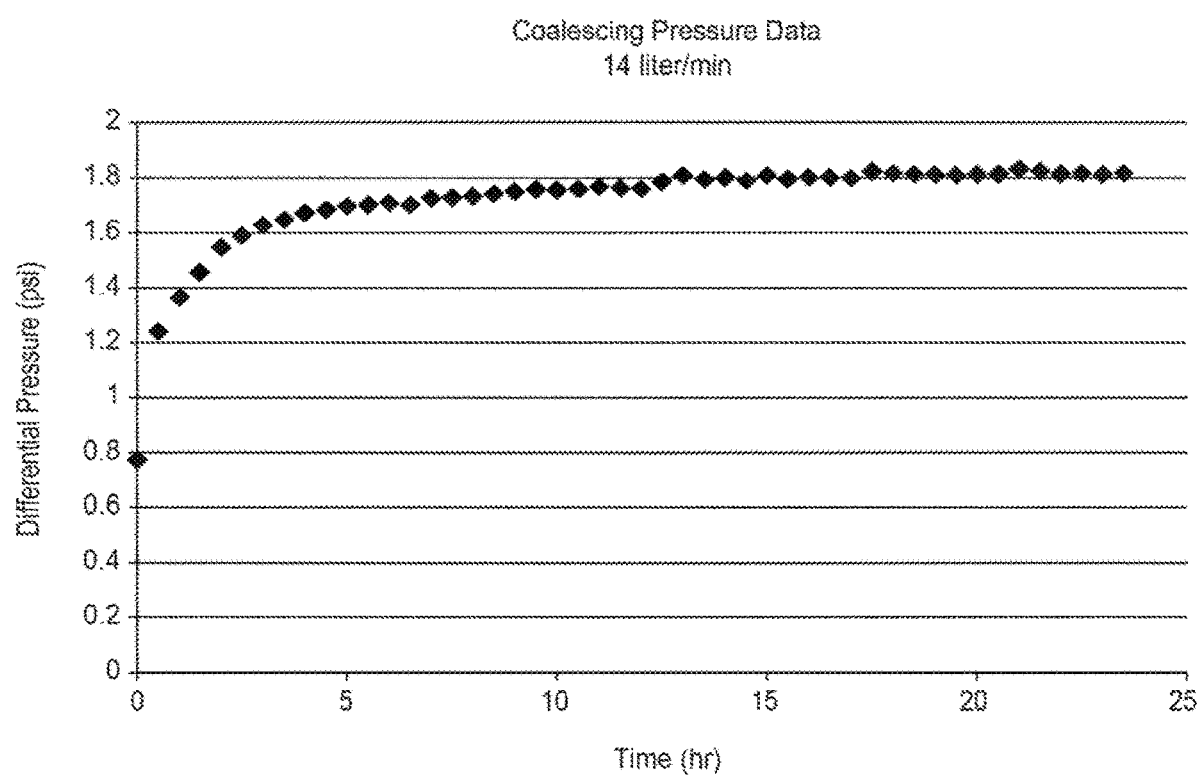
FIG. 11 is a graph depicting example test results of one type of coalescing media consistent with the technology disclosed herein.

FIG. 11 depicts test data collected that is associated with similar test set-up as that described with reference to FIG. 8, except that in this test a relatively high airflow was used of 14 liter/min to observe the pressure drop across the coalescing region of a barrier vent as it is loaded with oil. Because of the high airflow used, the aerosol-impregnated airstream was directed downwardly through the coalescing region so as not to counteract the effect of gravity on draining the coalesced oil from the coalescing region. For that reason, and to observe the characteristics of the coalescing region alone, a membrane, a cap, and a spacer were omitted from the tested vent assembly. The results depicted in FIG. 11 demonstrate that the pressure differential across the coalescing filter media appears to substantially plateau as time passes. This result appears to be consistent with the conclusion that after a threshold mass of entrained oil is loaded in the coalescing filter region, the coalescing filter region reaches a substantially steady-state where the mass of oil draining from the coalescing filter region is doing so at a similar rate as the mass of oil being introduced into the coalescing filter region.

In a variety of embodiments consistent with the technology disclosed herein, a substantial portion of the layers of filter media within the coalescing region will not absorb or adsorb a droplet of liquid oil, where a "substantial portion" refers to at least 95%, 99% or 100% of the layers of filter media, and the liquid oil is consistent with the type of oil used in the environment in which the filter media will be used. A test was conducted comparing a coalescing sheet of filter media from the coalescing region of the technology disclosed herein to an oil-sorbent sheet of filter media from the VE2048 breather vent by Gore Enterprises. The coalescing sheet of filter media had 7.5% cellulose fibers by weight and the remaining content was bi-component polyester fibers. The coalescing sheet of filter media had an oleophobic treatment. The oil-sorbent sheet of filter media was cellulose fibers that were not treated to be oleophobic. A droplet of liquid gear oil (Mopar SAE 75 W-140) was placed on a surface of each of the types of filter media. FIGS. 12a and 12b is a schematic drawing representing the coalescing sheet of filter media and the oil-sorbent sheet of filter media, respectively, after dropping the oil onto their surfaces. As is demonstrated, the droplet on the coalescing sheet of filter media remains substantially intact on the surface of the sheet of filter media, while the droplet on the oil-sorbent sheet of filter media is completely absorbed by the sheet of filter media.

In a variety of embodiments consistent with the technology disclosed herein, a substantial portion of the fibers in the filter media within the coalescing region are oleophobic and are not a sorbent of oil, where "a substantial portion" refers to at least 95%, 99%, and can be 100% of the fibers in the coalescing region, and the oil is consistent with the type of oil used in the environment in which the filter media will be used. A test was conducted comparing the fibers in the coalescing sheet of filter media to the fibers in the oil-sorbent sheet of filter media from the VE2048 breather vent, each described above with regard to FIGS. 12a-12b. Photos were taken to document the interaction between droplets of liquid gear oil (Mopar SAE 75 W-140) and each of the types of fibers, and contact angles between the fibers and the oil droplet were recorded and averaged. The contact angle is a measurement of the line defined by the outer contact points (L, R, See FIGS. 13a-13c) between the droplet and the fiber and the lines tangent to the droplet where it intersects the fiber.

FIG. 13a is a schematic drawing depicting the contact angle between an example oil droplet and a bi-component fiber of the coalescing filter media. The contact angle had an average of about 124.5°±2.6°, comparing multiple samples. FIG. 13b is a schematic drawing depicting the contact angle between an example oil droplet and the cellulose fiber of the coalescing filter media. The samples tested had a contact angle average of about 98.5°±2.8°. FIG. 13c is a schematic drawing depicting the contact angle between an example oil droplet and a cellulose fiber from the oil-sorbent media. The measured contact angles had an average of about 87.4°±1.5°. Generally oil-sorbent fibers will have a contact angle of less than 90° with the oil droplet, indicating that at least some of the oil from the droplet is forming a film along the surface of the fiber. Oleophobic coalescing fibers, on the other hand, will have a contact angle of greater than 90° with the oil droplet.

Method

Figure 14:
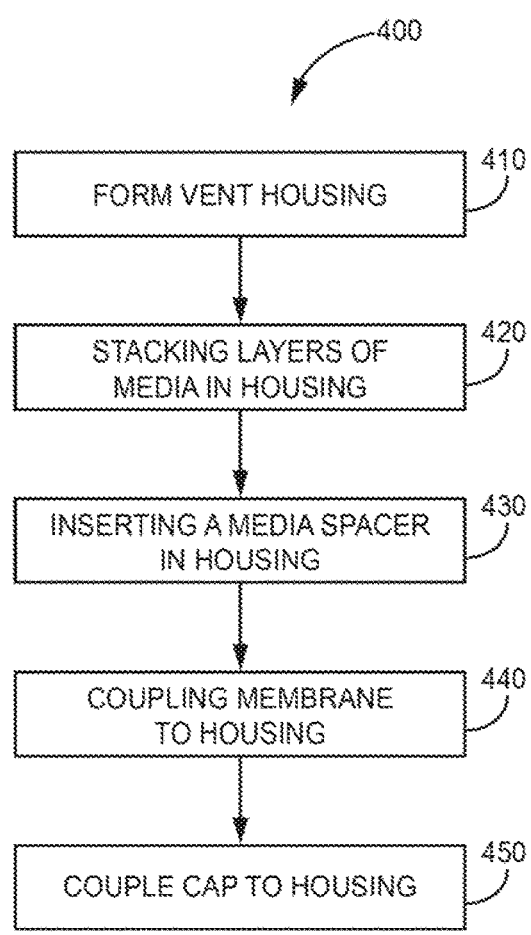
FIG. 14 is a flow chart depicting one method consistent with the technology disclosed herein.

FIG. 14 is a flow chart depicting one method consistent with the technology disclosed herein. The method 400 is generally consistent with making a vent assembly.

A vent housing is formed 410. Layers of coalescing filter media are stacked in the housing 420. A media spacer is inserted in the housing 430. A membrane is coupled to the housing 440. A cap is coupled to the housing 450.

The vent housing is generally formed 410 to have a first end and a second end, and to define an airflow pathway extending from the first end to the second end. The vent housing can be formed 410 consistently with approaches that will generally be understood in the art. In one embodiment, the vent housing is formed 410 through an injection molding process. In another embodiment, the vent housing is formed 410 through blow molding. The vent housing can be formed 410 from a variety of materials and combinations of materials. In one embodiment the vent housing is formed 410 from one or more of nylon, polyamide, glass-filled polyamide, polybutylene terephthalate, glass-filled polybutylene terephthalate, high-density polyethylene, and/or polypropylene.

When stacking a plurality of layers of coalescing filter media in the housing 420, the plurality of layers of coalescing filter media are generally stacked within the airflow pathway. Stacking the plurality of layers in the airflow pathway of the housing can be executed such that some of the layers of the coalescing filter media are non-aligned with some other of the layers of coalescing filter media. Non-alignment of at least a portion of the plurality of layers of coalescing filter media can have the advantage of preventing air within the breather vent from bypassing the coalescing filter media.

Similar to the embodiments described above, a majority of the plurality of layers of the coalescing filter media each has a maximum particle filtration efficiency of 10%, such as an efficiency of 7%. In some embodiments at least 50 layers of coalescing filter media are stacked within the vent housing. In one particular embodiment, about 90 layers of coalescing filter media are stacked within the vent housing. In some embodiments, each layer of stacked coalescing filter media is substantially unbonded to adjacent layers of stacked coalescing filter media. The coalescing filter media can be a variety of materials and combinations of materials, as described above.

In some embodiments a secondary layer of coalescing filter media can be stacked in the vent housing, wherein the secondary layer of coalescing filter media has a particle filtration efficiency of at least 48%. In one particular embodiment the secondary layer of coalescing filter media has an efficiency of at least 60%. The secondary layer of coalescing filter media can be positioned towards the top portion of the stack of the plurality of layers of coalescing filter media. In one embodiment the secondary layer of coalescing filter media can be positioned between the remaining layers of coalescing filter media and the membrane. The coalescing region can have an overall particle filtration efficiency of at least 95%, and a pressure drop of less than 1.2 psi at 1.2 meters per second, as has been described herein.

Inserting a media spacer in the housing 430 can aid in containing the plurality of layers of coalescing filter media in the housing. In one preferred embodiment, the media spacer and the vent housing mutually define an interference fit such that inserting the media spacer in the housing 430 causes a coupling structure defined by the media spacer to engage a mating structure defined by the vent housing. In an alternate embodiment, the media spacer may be bonded to the vent housing, such as by a thermal weld.

The membrane is generally coupled to the vent housing 440 in a spaced relationship from the coalescing filter media. In a variety of embodiments the membrane is coupled to a membrane receiving surface 440 defined by the vent housing. In one embodiment, the membrane is coupled to the vent housing 440 with an adhesive. In another embodiment, the membrane is coupled to the vent housing 440 by a weld, such as a thermal weld or ultrasonic weld.

In a variety of embodiments, the method of making a vent assembly can have the additional step of coupling a cap to the housing 450 to shield a flow face of the membrane from the environment. The cap can be positioned substantially parallel to the flow face of the membrane, in some embodiments.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A vent assembly comprising:
   a vent housing comprising a mounting structure;
   a membrane coupled to the vent housing;
   a coalescing region between the mounting structure and the membrane;
   a spacing region between the coalescing region and the membrane;
   an airflow pathway extending through the mounting structure, wherein the airflow pathway further extends from the mounting structure to the environment external to the vent housing through the coalescing region, the spacing region, and the membrane; and
   a draining pathway from the coalescing region through the mounting structure along the airflow pathway.

2. The vent assembly of claim 1, wherein the coalescing region comprises coalescing filter media.

3. The vent assembly of claim 2, wherein the coalescing filter media comprises a plurality of layers of synthetic filter media.

4. The vent assembly of claim 3, wherein each of the layers of synthetic filter media has a central axis, and a plurality of the central axes are not collinear.

5. The vent assembly of claim 3, wherein each layer of synthetic filter media is substantially unbonded to adjacent layers of synthetic filter media.

6. The vent assembly of claim 3, wherein the coalescing region further comprises a secondary layer of synthetic, coalescing filter media, wherein the secondary layer of coalescing filter media has a particle filtration efficiency of at least 48%.

7. The vent assembly of claim 1, wherein the coalescing region comprises bi-component fibers.

8. The vent assembly of claim 1, wherein the coalescing region comprises polyester.

9. The vent assembly of claim 1, wherein the coalescing region lacks a binder material.

10. The vent assembly of claim 1, wherein the coalescing region is oleophobic.

11. The vent assembly of claim 1, wherein the coalescing region comprises glass fibers.

12. The vent assembly of claim 11, wherein the glass fibers are microfibers.

13. The vent assembly of claim 1, wherein the coalescing region has an overall particle filtration efficiency of at least 95%.

14. The vent assembly of claim 1, further comprising a media spacer between the coalescing region and the membrane, wherein the media spacer is configured to prevent contact between the coalescing region and the membrane, and the airflow pathway extends through the media spacer.

15. The vent assembly of claim 14, further comprising an interference fit between the media spacer and the vent housing.

16. The vent assembly of claim 1, wherein the housing defines perimeter openings such that the airflow pathway extends from the membrane to the external environment through the perimeter openings.

17. The vent assembly of claim 1, further comprising a cap coupled to the housing, wherein the cap is configured to shield a flow face of the membrane from the environment.

18. A method of making a vent assembly, comprising:
   forming a vent housing having a first end and a second end, wherein the vent housing comprises a mounting structure, and the vent housing defines an airflow pathway through the mounting structure;
   inserting coalescing filter media in the airflow pathway within the housing to define a coalescing region of the vent assembly within the airflow pathway;
   inserting a media spacer to contain the coalescing filter media in the housing; and
   coupling a membrane to the vent housing in a spaced relationship from the coalescing filter media, wherein the membrane is disposed across the airflow pathway, the coalescing region is between the mounting structure and the membrane, a spacing region is defined between the coalescing region and the membrane, the airflow pathway extends from the mounting structure to the environment external to the vent housing through the coalescing region, the spacing region, and the membrane, and a draining pathway is defined from the coalescing region through the mounting structure along the airflow pathway.

19. The method of claim 18, further comprising coupling a cap to the housing to shield a flow face of the membrane from the environment.

20. The method of claim 18, wherein the coalescing filter media is oleophobic.

\* \* \* \* \*